(No Model.)
G. H. POND.
STEAM BOILER.
No. 250,837.
2 Sheets—Sheet 1.
Patented Dec. 13, 1881.
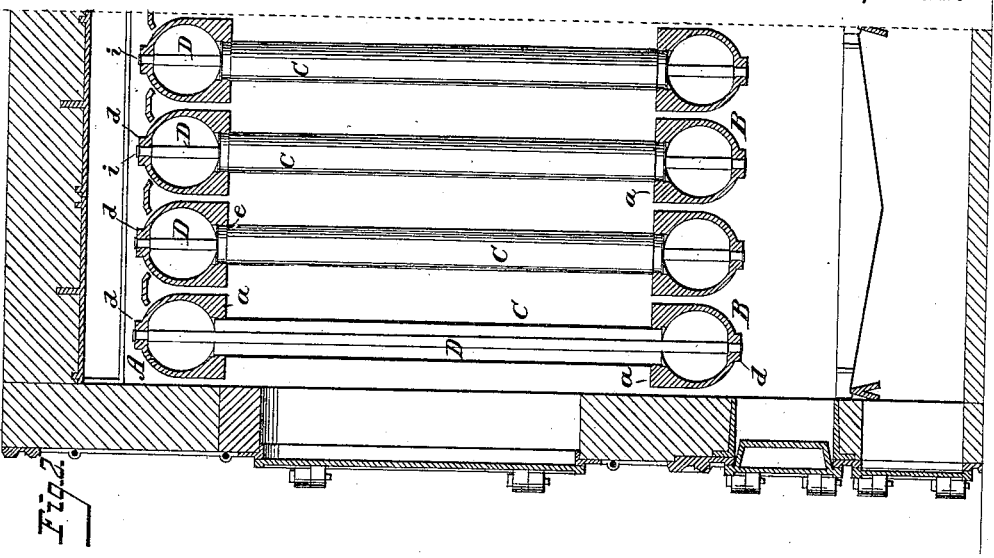
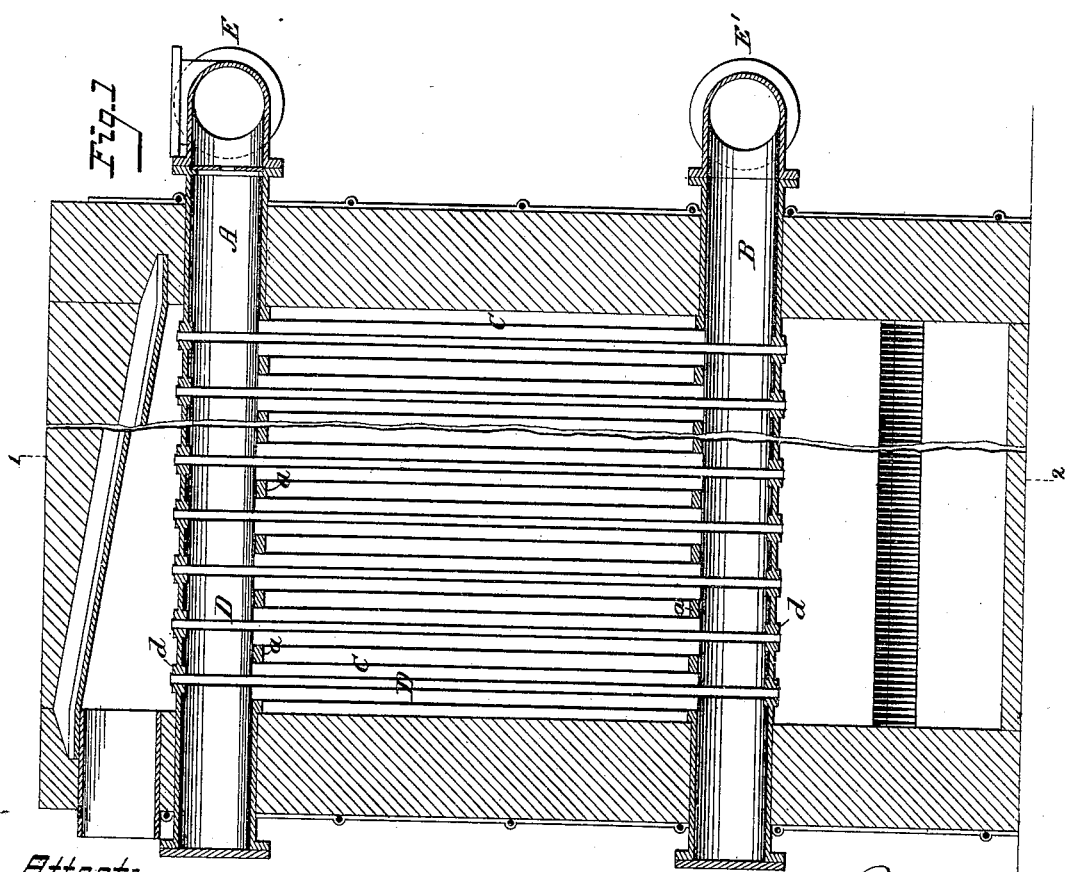
Attest:
Courtney A. Cooper.
H. Hansmann.
G. H. Pond
By his attorney
Charles E. Foster (No Model.) 2 Sheets—Sheet 2.

G. H. POND.
STEAM BOILER.

No. 250,837. Patented Dec. 13, 1881.

Attest:
Courtney A. Cooper
H. S. Hansmann

G. H. Pond
By his atty
Charles E. Foster

N. PETERS. Photo-Lithographer, Washington, D. C.

UNITED STATES PATENT OFFICE.

GOLDSBURY H. POND, OF NEW YORK, N. Y.

STEAM-BOILER.

SPECIFICATION forming part of Letters Patent No. 250,837, dated December 13, 1881.

Application filed October 18, 1881. (No model.)

*To all whom it may concern:*

Be it known that I, GOLDSBURY H. POND, of the city, county, and State of New York, have invented certain Improvements in Steam-Boilers, of which the following is the specification.

My invention relates to that class of steam-generators in which a series of sections are combined and connected to form the boiler; and my invention consists in the construction hereinafter described, whereby to combine in each section a series of vertical water-pipes, a series of vertical fire-tubes, and upper and lower straight cylindrical pipes or drums, without the use of bolts, screws, or thimbles, forming steam and water tight joints that will not open from expansion or pressure.

Figure 3:
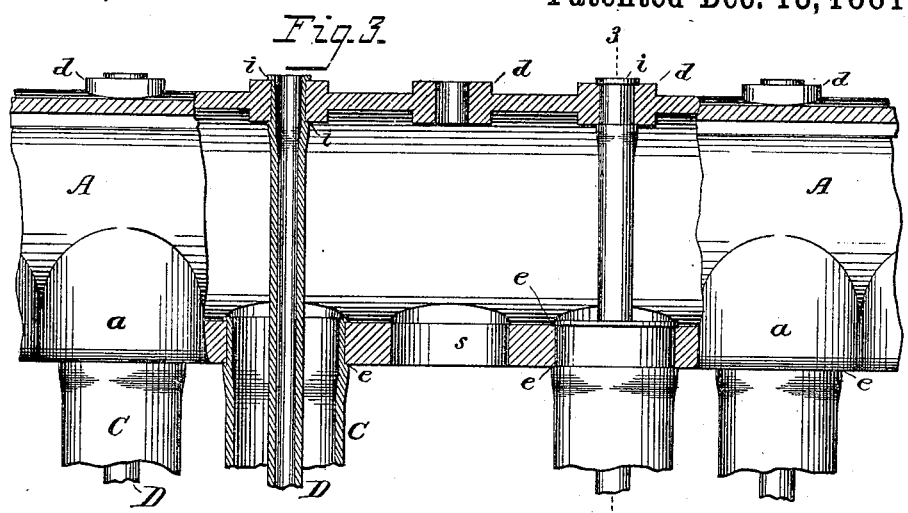
Figure 4:
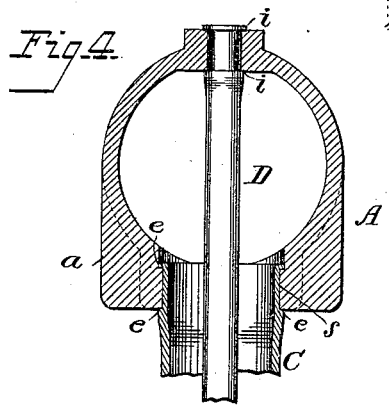
Figure 5:
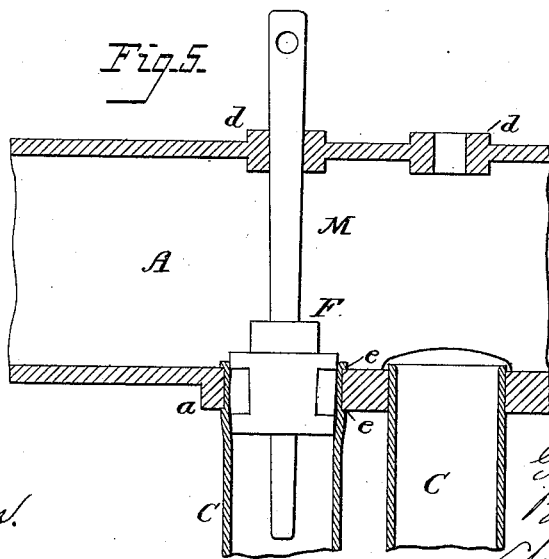

In the drawings, Figure 1 is an elevation, in section, of a sectional boiler showing my improvements. Fig. 2 is a half-section on the line 1 2, Fig. 1. Fig. 3 is a detached view of one of the connecting-drums, partly in section, showing the ends of the vertical pipes. Fig. 4 is a section on the line 3 4, Fig. 3. Fig. 5 is a section showing the mode of fastening the drums and vertical tubes.

The boiler consists of a series of sections, each of which is composed of two parallel cylindrical drums, A and B, water-tubes C, at right angles with the drums and connected therewith, and fire-tubes D, smaller in diameter than and extending centrally through the tubes and through the drums.

Heretofore it has been common to connect the fire and water tubes and drums by screw-connections, by thimbles, flanges, and rivets, or bolts, all of which are expensive, difficult to manipulate, and liable to form joints that leak under heavy pressure or from expansion of the metal. Fire and water tubes have also been connected, by expanding their ends, to spherical enlargements in cast-metal boiler-heads comprising a nest of such spheres; but it has heretofore been considered essential, in making the connection with cylindrical drums, to use the means before alluded to, inasmuch as the rounded sides of the drums would not permit a tight joint to be made by expanding the tubes, and the contracted openings for the fire-tubes would not permit the introduction of an expanding-tool adapted to operate upon the large ends of the water-tubes.

My invention consists in the mode of construction whereby I am enabled to use cylindrical drums and expand the ends of all the tubes in their sockets, so as to secure them so firmly and with such close joints that leaking becomes practically impossible; a stronger union is effected than can be secured by screw-joints and thimbles; the parts are more readily put together, and less injury will result from expansion and contraction than when bolts are used. For this purpose I cast each drum with two series of socketed bosses, one series, $a$, largest in diameter, being on one side, and the other series, $d$, which is smaller, being diametrically opposite the first. The bosses $d$ extend both into and outside of the drums, so that the sockets formed therein for the ends of the fire-tubes D shall be of uniform depth throughout, and the bosses $a$ are formed with inner annular flanges, $s$, so as to present annular bearings of uniform width throughout for the ends of the outer water-tubes, C.

In building the generator the tubes C are first inserted in their sockets, an expansion-tool, F, is introduced into the end of the drum and brought to its position within the end of tube C, and a mandrel or spindle, M, is passed through the socket in the opposite boss $d$, Fig. 5, and is manipulated to operate the tool until the end of the tube is distended and annular shoulders $e\ e$ are formed, locking the tube immovably in the socket to the flange $s$. The mandrel and tool are then removed, and the fire-tubes D are placed in the water-tubes and are locked in place and to the drums by expanding their ends by means of an appropriate tool to form shoulders $i\ i$, that have their bearings on the outer and inner faces of the bosses $d$. Both sets of tubes are thus connected, without screws or bolts, to the cylindrical water and steam drums, avoiding the necessity of forming the latter with spherical enlargements to facilitate manipulation, and rendering available a better form of connections. The drums have flanged ends for bolting to the flanged necks of cross-drums E E', which latter connect the series of sections in one.

I do not limit myself as to the number and arrangement of the sections which compose the boiler, my invention relating to the fastening devices connecting the tubes and cylindrical drums.

I claim—

1. The combination, in a sectional boiler, of straight cylindrical drums formed with socketed bosses $a$, and bosses $d$, projecting into and out of the drum, and water-tubes C, and inner fire-tubes, D, with expanded ends fitting said sockets and connecting the drums, substantially as set forth.

2. The combination of the straight cylindrical drum, having socketed bosses $a$, extending into and out of the drum, to form sockets of uniform depth, and with bosses $d$, having annular flanges $s$, of uniform thickness, and tubes C D, expanded to form shoulders $e\ i$, bearing on the faces of the bosses, substantially as set forth.

In testimony whereof I have signed my name to this specification in the presence of two subscribing witnesses.

G. H. POND.

Witnesses:
CHARLES E. FOSTER,
A. E. HANSMANN.